United States Patent [19]
Ejiri et al.

[11] Patent Number: 4,639,624
[45] Date of Patent: Jan. 27, 1987

[54] TORQUE MOTOR HAVING A COIL WITH FINITE TURNING RANGE

[75] Inventors: Yuuki Ejiri; Tomoo Ito, both of Katsuta; Hisato Tsuruta, Hitachi; Hiroshi Kamifuji, Katsuta, all of Japan

[73] Assignee: Hitachi, Ltd., Tokyo, Japan

[21] Appl. No.: 759,964

[22] Filed: Jul. 29, 1985

[30] Foreign Application Priority Data

Jul. 27, 1984 [JP] Japan .................................. 59-158258

[51] Int. Cl.$^4$ .......................................... H02K 17/32
[52] U.S. Cl. .................................... 310/154; 123/585; 310/268; 335/222
[58] Field of Search .................... 310/68 B, 78, 80, 83, 310/154, 171, 268, 27, 38, 116; 335/222; 123/585

[56] References Cited

U.S. PATENT DOCUMENTS

| | | | |
|---|---|---|---|
| 3,530,380 | 9/1970 | Andreaggi | 335/222 |
| 3,611,222 | 10/1971 | Sauvignet | 335/222 |
| 4,388,913 | 6/1983 | Grimm et al. | 123/585 |
| 4,443,724 | 4/1984 | Handlykken | 310/68 B |
| 4,553,058 | 11/1985 | Iwasaki | 310/268 |
| 4,558,937 | 12/1985 | Petersen et al. | 335/222 |

Primary Examiner—Peter S. Wong
Assistant Examiner—D. L. Rebsch
Attorney, Agent, or Firm—Antonelli, Terry & Wands

[57] ABSTRACT

A torque motor including a housing, a shaft member extending through the housing and supported by bearings, a stationary core in the housing and at least one coil fixed to the shaft member and arranged for rotation with respect to the stationary core within a finite range. Magnets are fixed to the housing for imparting rotational force to the coil and support members are provided in the housing for fixedly supporting the stationary core. The coil is provided with oppositely disposed free ends and extends across the stationary core between the free ends such that each of the free ends projects beyond an outer peripheral surface of the stationary core without contacting the stationary core. The support members include at least two plate members on opposite sides of the shaft member, the magnets being within the housing at portions other than where the support members are disposed.

14 Claims, 18 Drawing Figures

TORQUE MOTOR HAVING A COIL WITH FINITE TURNING RANGE

BACKGROUND OF THE INVENTION

The present invention relates to a torque motor, and more particularly to a torque motor suitable for use in driving a throttle valve for automobiles.

A throttle valve control device for automobiles includes a controller, an actuator for driving a throttle valve, and a throttle valve. The throttle valve control device has employed a motor rotating over an angular range of 360° as the actuator for driving the throttle valve. (U.S. Pat. No. 4,388,913).

However, the throttle valve for automobiles does not make a complete revolution; it rotates about 90°. For this reason, rotation of the motor is converted to finite rotation of the throttle valve through a gear or the like.

Using such a motor which rotates 360° has involved disadvantages, in that no current flows in some of the coils due to rectification, and torque is not always generated effectively, dependent on the form of winding wires. This results in the disadvantage that the motor is relatively large with respect to its torque.

Inherently, therefore, a motor for driving the throttle valve to rotate through an angular range corresponding to the opening thereof is sufficient; it need not rotate over 360°. Nevertheless, the motors which rotate 360° have been employed as the actuator for driving the throttle valve in the conventional throttle valve control device.

SUMMARY OF THE INVENTION

An object of the present invention is to provide a relatively small torque motor.

The present invention serves to reduce the size of torque motors by preparing a housing provided at its center with a shaft therethrough, fixedly supporting a stationary core at the center of the housing with a support which is not in contact with the shaft, forming a coil fixed to the shaft to surround the stationary core, and by providing magnets within the housing to produce one part of the magnetic flux directed toward the stationary core and the remaining part of the magnetic flux directed outwardly from the stationary core.

Furthermore, the present invention serves to reduce the size of torque motors by preparing a housing provided at its center with a shaft therethrough, fixedly supporting a disc magnet at the center of the housing with a support which is not in contact with the shaft, and forming a coil fixed to the shaft to surround the disc magnet, whereby magnetic flux emanates from the disc magnet to the housing to form a magnetic circuit, thereby producing forces on the coil.

According to the present invention, as the torque motor can be made smaller by effectively utilizing the coil, there can be achieved reduction in the size of torque motors.

DETAILED DESCRIPTION OF THE PREFERRED EMBODIMENTS

Figure 18:
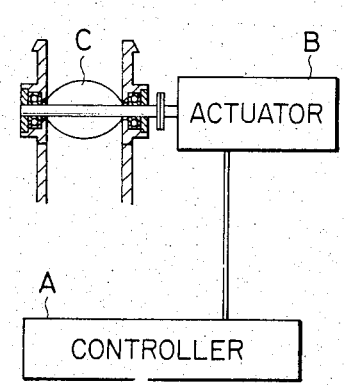
FIG. 18 is a schematic view of a throttle valve control device system for the automobiles.

A throttle valve control device for automobiles includes a controller A, an actuator B for driving a throttle valve, and a throttle valve C, as shown in FIG. 18. The present invention relates to a torque motor for use as the actuator for the throttle valve C.

Hereinafter, embodiments of the present invention will be described.

EMBODIMENT 1

Figure 1:
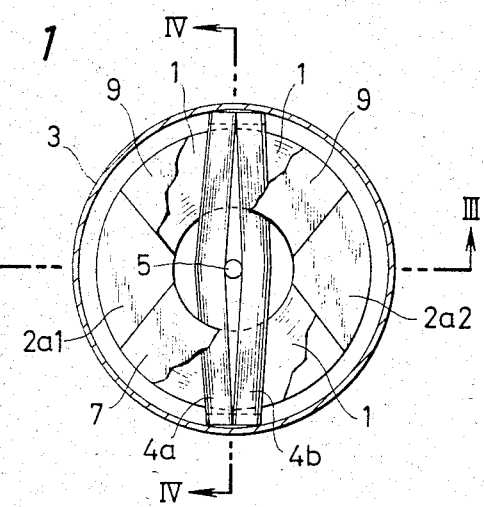
FIG. 1 is an inner structure sectional view of a torque motor showing a first embodiment of the present invention, in which an upper part of a housing is omitted, when viewed in the axial direction.
Figure 3:
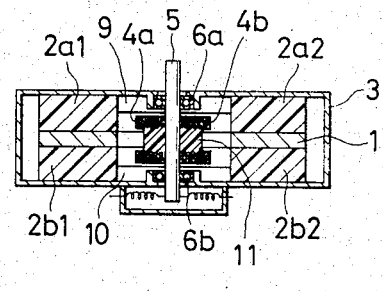
FIG. 3 is a sectional view taken along line III—III in FIG. 1.
Figure 4:
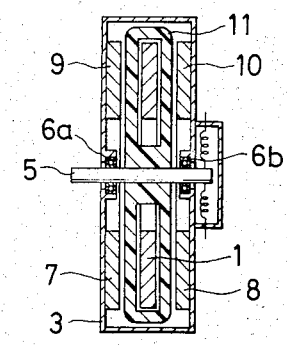
FIG. 4 is a sectional view taken along line IV—IV in FIG. 1.

FIG. 1 shows an inner structural view of a torque motor of one embodiment of the present invention in which an upper part of a housing when viewed in the axial direction, FIG. 3 shows a sectional view taken along the line III—III in FIG. 1, and FIG. 4 shows a sectional view taken along the line IV—IV in FIG. 1.

A stationary core 1 made of magnetic permeable material having a doughnut-like disc form is rigidly supported by upper supports 2a1 and 2a2 and by lower supports 2b1 and 2b2 made of plastic material respectively, each formed into a sector shape within a cylindrically formed housing 3, as shown in FIG. 3.

The same sector shaped upper support 2a1 and 2a2 is provided respectively within the housing 3 opposite each other on the stationary core 1. The same sector shaped lower support 2b1 and 2b2 is provided respectively within the housing 3 opposite each other on the stationary core 1.

The sector shaped upper support 2a1 and lower support 2b1 and the sector shaped upper support 2a2 and lower support 2b2 are disposed respectively to overlap each other on the stationary core 1. The upper supports 2a1, 2a2 and the lower supports, 2b1, 2b2 rigidly sandwich the stationary core 1.

At the center of the housing 3, a shaft 5 is provided through a pair of bearings 6a and 6b as shown FIG. 3 and FIG. 4. Two bands of belt-like coil assemblies 4a and 4b as shown in FIG. 1 are provided round the shaft 5 to surround the stationary core 1 without contacting the stationary core 1. The coils 4a and 4b are molded with a resin 11 as shown in FIG. 3 and FIG. 4.

Two bands of coils 4a and 4b are provided on the outer surface of the stationary core 1, except for those portions including the upper supports 2a1, 2a2 and the lower supports 2b1, 2b2 respectively. The two bands of coils 4a and 4b project from the outer surface of the stationary core 1 and surround the stationary core 1.

Figure 2:
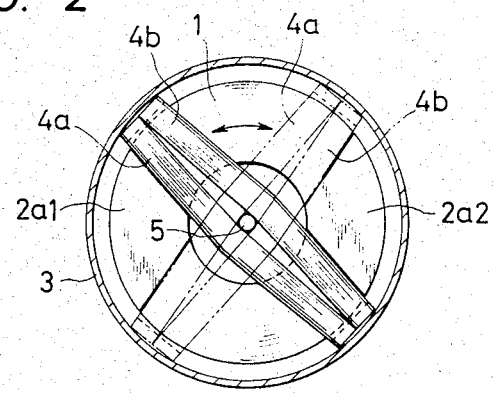
FIG. 2 is an explanational view of the torque motor showing movement of coil assemblies.

The coils 4a and 4b are turned within the stationary core 1, except for those portions including the upper supports 2a1, 2a2 and the lower supports 2b1, 2b2, respectively, as shown in FIG. 2.

Although the coils 4a and 4b are turned with the torque, it is capable of turning only within a finite range because of being stopped at the supports 2a1, 2b1 or the supports 2a2, 2b2 on the stationary core 1.

In this embodiment, such a finite turning range is set to be 85°. This value of the finite range is set to coincide with the degree of opening of the throttle valve C. The adjustable turning angle of the coils 4a and 4b can be increased or decreased by changing the size of the upper supports 2a1, 2a2 or the lower supports 2b1, 2b2.

Further, at the upper and lower inner surfaces of the housing 3 there are provided four magnets 7, 8 and 9, 10 to sandwich the stationary core 1 therebetween, as shown in FIG. 4, except for those portions including the upper supports 2a1, 2a2 and the lower supports 2b1, 2b2. These magnets 7, 8, 9 and 10 are magnetized such that the inner side of the magnet 7 exhibits an N pole, the inner side of the magnet 8 exhibits an N pole, the inner side of the magnet 9 exhibits an S pole, and the inner side of the magnet 10 exhibits an S pole respectively. Besides, lead wires of the coils 4a and 4b are led out to the exterior of the housing 3 through the hollow inner portion of the shaft 5.

In this construction, when the coils 4a and 4b are energized from the exterior, current flows through the coils 4a and 4b upper to lower on the left side of FIG. 4 and from lower to upper on the right side of FIG. 4. Because the side of the magnet 7 facing the coils 4a and 4b exhibits a N pole, magnetic flux is generated from the magnet 7 to the stationary core 1. Current flows from upper to lower through the coils 4a and 4b crossing the magnetic flux thus produced, so that a force emanates from the rear to the front of the view shown in FIG. 4.

Between the magnet 8 and the stationary core 1, magnetic flux emanates from the magnet 8 to the stationary core 1 of FIG. 4 with the side of the magnet 8 opposite the coils 4a and 4b exhibiting an N pole. Current flows from lower to upper in the figure through the coils 4a and 4b crossing the magnetic flux thus produced, so that a force similar to that of the magnet 7 emanates from rear to front in the view shown in FIG. 4.

Between the magnet 9 and the stationary core 1, magnetic flux emanates from the stationary core 1 to the magnet 9 with the side of the magnet 9 opposite to the coils 4a and 4b exhibiting an S pole. Current flows from upper to lower in the figure through the coils 4a and 4b crossing the magnetic flux thus produced, so that a force emanates from front to rear of the view shown in FIG. 4.

Furthermore, between the magnet 10 and the stationary core 1, magnetic flux emanates from the stationary core 1 to the magnet 10 with the side of the magnet 10 opposite to the stationary core 1 exhibiting an S pole. Current flows from lower to upper through the coils 4a and 4b crossing the magnetic flux thus produced, so that a force emanates from the front to the rear of the view shown in FIG. 4.

Based on those actions, the output torque of the shaft 5 is determined from the forces produced on the coil 4a and 4b between the magnets 7, 8, 9 and 10 and the stationary core 1, as well as the as the distance between the coils 4a and 4b annd the shaft center. Although the coils 4a and 4b are turned with the torque thus produced, it is capable of turning only within a finite range because of being stopped at the supports 2a1, 2b1 or at the supports 2a2, 2b2 on the stationary core 1. In this embodiment, such a finite turning range is set to be 85°.

EMBODIMENT 2

A modified embodiment of the torque motor of the present invention will be described. This embodiment is a modified embodiment of the torque motor of Embodiment 1 shown from FIG. 1 to FIG. 4.

Figure 5:
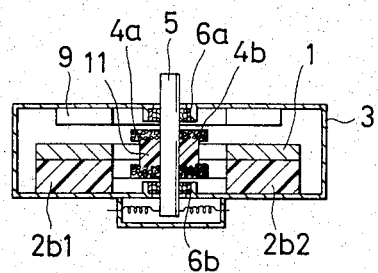
FIG. 5 is a sectional view of a torque motor showing a second embodiment of the present invention.

Only the lower supports 2b1 and b2 for supporting the stationary core 1 are provided on one side of the housing 3 as shown in FIG. 5. The stationary core 1 is fixed in a cantilevered manner by the lower supports 2b1 and 2b2. This reduces the weight of the torque motor.

EMBODIMENT 3

An another embodiment of the torque motor of the present invention will be described. This embodiment is a modified embodiment of the torque motor of Embodiment 1 shown from FIG. 1 to FIG. 4.

Figure 6:
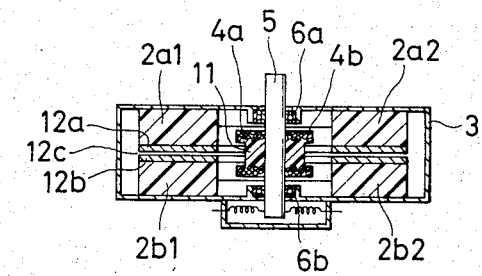
FIG. 6 is a sectional view of atorque motor showing a third embodiment of the present invention.

The stationary core comprises a two-stage core 12a and 12b using two doughnut-like disc plates placed one over the other as shown in FIG. 6. The two separate stationary cores 12a and 12b are fixed without being in contact so as to produce a gap 12c therebetween.

The upper stationary core 12a is fixed to the sector shaped supports 2a1, 2b1 and the lower stationary core 12b is fixed to the sector shaped supports 2a2, 2b2 respectively. This reduces the weight of the torque motor.

EMBODIMENT 4

A still further embodiment of the torque motor of the present invention will be described. This embodiment is a modified embodiment of the torque motor of Embodiment 3 shown in FIG. 6.

Figure 7:
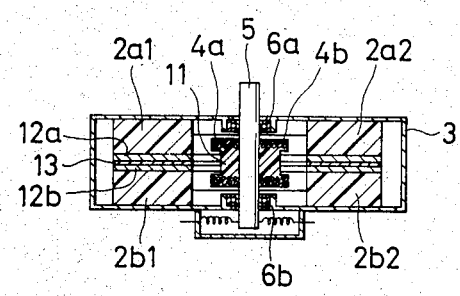
FIG. 7 is a sectional view of a torque motor showing a fourth embodiment of the present invention.

The gap 12c between the upper stationary core 12a and the lower stationary core 12b in FIG. 6 is filled with a spacer 13 made of metal as shown in FIG. 7.

EMBODIMENT 5

A further embodiment of the torque motor of the present invention will be described. This embodiment is a modified embodiment of the torque motor of Embodiment 1 shown from FIG. 1 to FIG. 4.

Figure 8:
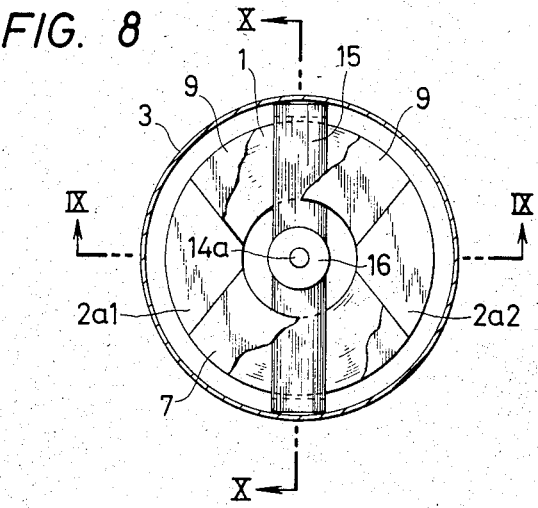
FIG. 8 is an inner structure sectional view of a torque motor showing a fifth embodiment of the present invention, in which an upper part of a housing is omitted, when viewed in the axial direction.
Figure 9:
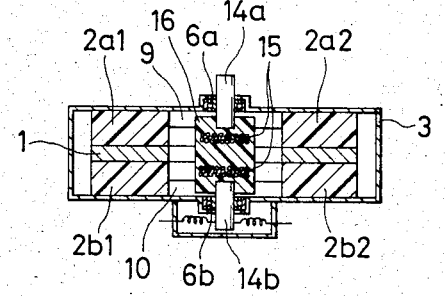
FIG. 9 is a sectional view taken along line IX—IX in FIG. 8.
Figure 10:
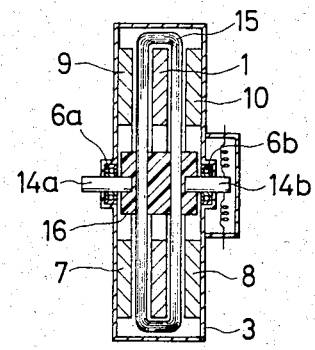
FIG. 10 is a sectional view taken along line X—X in FIG. 8.

FIG. 8 is an inner structural view of a torque motor, is which an upper part of a housing is omitted, when viewed in the axial direction, FIG. 9 is a sectional view taken along the line IX—IX in FIG. 8 and FIG. 10 is a sectional view taken along the line X—X in FIG. 8.

In this embodiment, as shown in FIG. 9 and FIG. 10, the shaft is divided into two parts 14a and 14b to provide a structure such that one band of belt-like coil assembly 15 is interposed between the two separate shafts 14a and 14b thus divided.

The coil 15 is molded with a resin 16 to surround the shafts 14a and 14b. The coil 15 is provided on the stationary core 1 therebetween, as shown in FIG. 8, except for those portions including the sector shaped upper supports 2a1, 2a2 and the sector shaped lower supports 2b, 2b2 respectively. The coil 15 projects from the outer surface of the stationary core 1 and surrounds the stationary core 1.

This coil 15 turns the stationary core 1, except for those portions including the upper supports 2a1, 2a2 and the lower supports 2b1, 2b2 respectively.

With this structure, it becomes possible to provide the coil 15 without the need of bypassing the single shaft 5 as Embodiment 1 of FIG. 1 to FIG. 4 and it is sufficient to provide the coil 15 in one pair or in single band.

EMBODIMENT 6

A still further embodiment of the torque motor of the present invention will be described. This embodiment is a modified embodiment of the torque motor of Embodiment 5 shown from FIG. 8 to FIG. 10.

Figure 11:
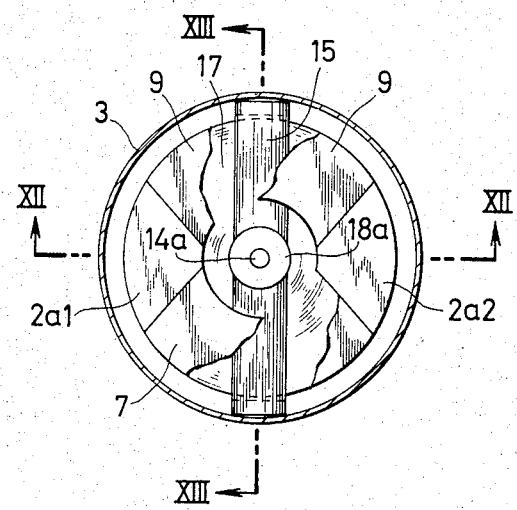
FIG. 11 is an inner structure sectional view of a torque motor showing a sixth embodiment of the present invention, in which an upper part of a housing is omitted, when viewed in the axial direction.
Figure 12:
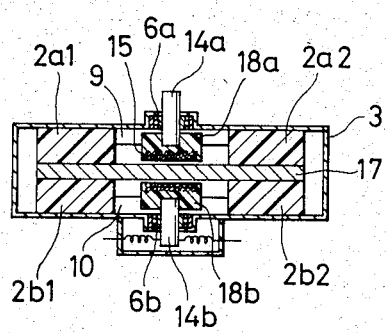
FIG. 12 is a sectional view taken along line XII—XII in FIG. 11.
Figure 13:
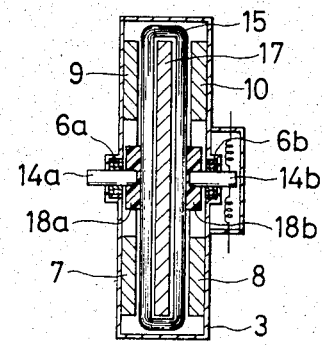
FIG. 13 is a sectional view taken along line XIII—XIII in FIG. 11.

FIG. 11 is an inner structural view of a torque motor, in which an upper part of a housing is omitted, when viewed in the axial direction, FIG. 12 is a sectional view taken along the line XII—XII in FIG. 11, and FIG. 13 is a sectional view taken along the line XIII—XIII in FIG. 11.

In this embodiment, a complete disc plate 17 is employed as the stationary core, as shown from FIG. 11 to FIG. 13, in place of the doughnut-like disc core as illustrated in Embodiment 5 shown in FIG. 9. The coil 15 is molded with a resin 18. With the stationary core formed into a complete disc shape in this way, it becomes possible to widen a magnetic path and to increase the intensity of magnetic flux.

EMBODIMENT 7

Another embodiment of the torque motor of the present invention will be described. This embodiment is a modified embodiment of the torque motor of Embodiment 1 shown from FIG. 1 to FIG. 4.

Figure 14:
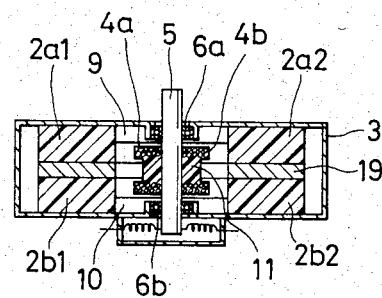
FIG. 14 and FIG. 15 are sectional views respectively of a torque motor showing a seventh embodiment of the present invention.
Figure 15:
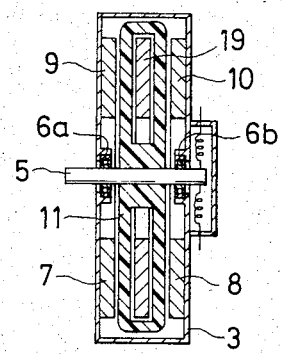

In this embodiment, there is employed a magnet 19, shown FIG. 14 and FIG. 15, in place of the stationary core. More specifically, the magnets 7, 8, 9 and 10 are arranged and magnetized similarly to those explained in connection with FIG. 1 to FIG. 4, whereas the magnet 19 is magnetized to exhibit an S pole on the lower side of FIG. 15 and an N pole on the upper side thereof. The strength of magnetic flux between each of the magnets 7, 8, 9 and 10 and the magnet 19 can be increased.

EMBODIMENT 8

A still further embodiment of the torque motor of the present invention will be described. This embodiment is a modified embodiment of the torque motor of Embodiment 7 shown in FIG. 14 and FIG. 15.

Figure 16:
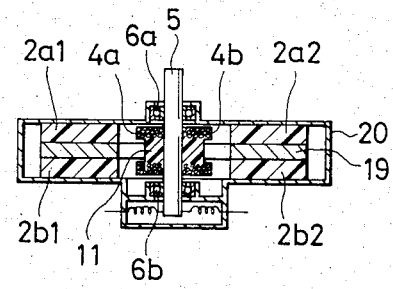
FIG. 16 and FIG. 17 are sectional views respectively of a torque motor showing an eighth embodiment of the present invention.
Figure 17:
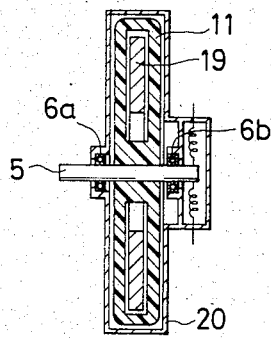

In this embodiment, as shown in FIG. 16 and FIG. 17, the magnets 7, 8, 9 and 10 used in Embodiment 7, as shown in FIG. 14 and FIG. 15, are all omitted.

A housing 20 is arranged to approach the coils 4a and 4b, and magnetic flux emanates from the magnet 19 to the housing 20 to form a magnetic circuit, thereby producing forces on the coils 4a and 4b.

What is claimed is:

1. A torque motor comprising a housing, shaft means extending through said housing and supported by bearing means, a stationary core disposed in said housing, at least one coil fixed to said shaft means and arranged for rotation with respect to said stationary core within a finite range, magnet means fixed to said housing for imparting rotational force to said at least one coil, support means in said housing for fixedly supporting said stationary core, said at least one coil being provided with oppositely disposed free ends and extending across said stationary core between the free ends such that each of the free ends projects beyond an outer peripheral surface of said stationary core without contacting said stationary core, said support means including at least two plate members disposed on opposite sides of said shaft means, and said magnet means being disposed within said housing at portions other than portions where said support means is disposed.

2. A torque motor according to claim 1, wherein said magnet means includes a plurality of magnets disposed within said housing so as to sandwich said stationary core therebetween.

3. A torque motor according to claim 2, wherein each of said at least two plate members of support means has a sector shape and is disposed for limiting the finite range of rotation of said at least one coil to the region between said two sector shaped plate members.

4. A torque motor according to claim 3, wherein said two sector shaped plate mebers are arranged to limit the finite turning range of said at least one coil to about 85°.

5. A torque motor according to claim 1, wherein said support means includes two plate members disposed on one side of said stationary core and two plate members disposed on an opposite side of said stationary core so that said stationary core is sandwiched therebetween, each of said two plate members being disposed on opposite sides of said shaft means.

6. A torque motor according to claim 1, wherein said stationary core is a doughnut-like disc member.

7. A torque motor according to claim 1, wherein said stationary core includes two doughnut-like disc plates spaced from one another to delimit a gap therebetween, said disc plates being fixedly supported by said support means.

8. A torque motor according to claim 7, further comprising a spacer member disposed in the gap between said two disc plates.

9. A torque motor according to claim 1, wherein said housing has a cylindrical shape, and said shaft means extends through said housing at the center thereof, said shaft means comprising two separate shaft members, and said at least one coil is interposed between said two shaft members.

10. A torque motor according to claim 1, wherein said stationary core is a doughnut-like disc magnet member.

11. A torque motor comprising a cylindrical housing, shaft means extending through said housing at the center thereof and supported by bearing means, a stationary core disposed in said housing, at least one coil fixed to said shaft means and arranged for rotation with respect to said stationary core within a finite range, magnet means fixed to said housing for imparting rotational force to said at least one coil, said shaft means including two separate shaft members, said stationary core being a doughnut-like disc member, said at least one coil being provided with oppositely disposed free ends and extending across said stationary core between the free ends such that each of the free ends projects beyond an outer peripheral surface of said stationary core without contacting said stationary core, said support means including at least two sector shaped plate members disposed on opposite sides of said shaft means, and said magnet means being disposed within said housing portions other than portions where said support means is disposed so as to sandwich said stationary core therebetween.

12. A torque motor according to claim 11, wherein said support means includes two plate members disposed on one side of said stationary core and two plate members disposed on an opposite side of said stationary core so that said stationary core is sandwiched therebetween, each of said two plate members being disposed on opposite sides of said shaft means so as to limit the finite range of rotation of said at least one coil to the region between said two plate members disposed on the opposite sides of said stationary core.

13. A torque motor comprising a cylindrical housing, shaft means extending through said housing at the center thereof and supported by bearing means, a doughnut-like disc magnet member being disposed in said housing, at least one coil fixed to said shaft means and arranged for rotation with respect to said disc magnet member within a finite range, magnet means fixed to said housing for imparting rotational force to said at least one coil, support means in said housing for fixedly supporting said disc magnet member, said at least one coil being provided with oppositely disposed free ends and extending across said disc magnet member between the free ends such that each of the free ends projects beyond an outer peripheral surface of said disc magnet member without contacting said disc magnet member, said support means including at least two sector shaped plate members disposed on opposite sides of said shaft means, and said magnet means including a plurality of magnets disposed within said housing at portions other than portions where said support means is disposed and arranged to sandwich said disc magnet member therebetween.

14. A torque motor according to claim 13, wherein said support means includes two sector shaped plate members disposed on one side of said disc magnet member and two sector plate members disposed on an opposite side of said disc magnet member so that said disc magnet member is sandwiched therebetween, each of said two sector shaped plate members being disposed on opposite sides of said shaft means for limiting the finite range of rotation of said at least one coil to the region between said two sector shaped plate members.

* * * * *